United States Patent

Mies

[19]

[11] Patent Number: 6,131,300
[45] Date of Patent: Oct. 17, 2000

[54] UNIVERSAL SCANNING HEAD FOR GEAR MEASUREMENTS

[75] Inventor: Georg Mies, Wipperfürth, Germany

[73] Assignee: Klingelnberg Sohne GmbH, Huckeswagen, Germany

[21] Appl. No.: 09/080,971

[22] Filed: May 19, 1998

[30] Foreign Application Priority Data

May 20, 1997 [DE] Germany .......................... 197 21 015

[51] Int. Cl.$^7$ ................................................. G01B 5/008
[52] U.S. Cl. ................................................ 33/556; 33/503
[58] Field of Search .............................. 33/545, 546, 549, 33/551, 553, 555, 556, 558, 559, 561, 503

[56] References Cited

U.S. PATENT DOCUMENTS

| | | | |
|---|---|---|---|
| 4,078,314 | 3/1978 | McMurtry | 33/503 |
| 5,029,398 | 7/1991 | Ertl . | |
| 5,119,568 | 6/1992 | Vesco et al. | 33/559 |
| 5,353,510 | 10/1994 | Ulbrich | 33/502 |
| 5,727,326 | 3/1998 | Mies et al. . | |

FOREIGN PATENT DOCUMENTS

| | | | |
|---|---|---|---|
| 0344871 | 12/1989 | European Pat. Off. | 33/558 |
| 0693669A2 | 6/1995 | European Pat. Off. . | |
| 3412302A1 | 3/1984 | Germany . | |
| 3905952A1 | 2/1989 | Germany . | |
| 19500451A1 | 1/1995 | Germany . | |
| 19501178C2 | 1/1995 | Germany . | |

*Primary Examiner*—Andrew H. Hirshfeld
*Assistant Examiner*—R. Alexander Smith
*Attorney, Agent, or Firm*—Volpe and Koenig, P.C.

[57] ABSTRACT

A scanning head for completely measuring gears and gear-like workpieces on numerically controlled measuring instruments must also posses 3-D properties for scanning unknown contours. To that end, the scanning pin or probe must deflect of its own accord in the currently prevailing direction normal to the contour being scanned. Only those scanning heads, whose behavior is statically and dynamically the same in all arbitrary deflection directions, can do this. The new scanning head achieves this by providing, for the three spatial coordinates X, Y, Z, two leaf spring parallelograms (1, 2) attached one behind the other to the stationary scanning head base (4). The first parallelogram (1), which is pivotable about the horizontal axis, permits deflections of the scanning pin carrier (3) in the XZ plane and the second parallelogram (2) permits deflections in the Y direction. Through this decoupling, achieved by means of connecting element (15) and the double-jointed rods (26), the displaced mass can be sufficiently close to being equally great in all arbitrary deflection directions. Preferably, the new scanning head is so constructed that, if desired, a predeterminable deflection direction in the XZ plane can be imparted to the scanning pin carrier (3) by means of a rotatable device (30).

4 Claims, 3 Drawing Sheets

UNIVERSAL SCANNING HEAD FOR GEAR MEASUREMENTS

BACKGROUND OF THE INVENTION

1. Field of the Invention

This invention refers to a horizontally oriented scanning head for numerically controlled gear-measuring instruments having a scanning pin or probe carrier which can be deflected parallel to itself with several degrees of freedom, which is linked to a stationary scanning head base via several spring-parallelogram systems in functionally parallel arrangement, and whose deflections are detectable by three sensors attached to the scanning head base for the three spatial coordinate directions X, Y, and Z. The horizontal Y-direction coincides with the longitudinal axis of the scanning head, the X-direction corresponds to the lateral deflection of the scanning pin carrier and the Z-direction to its vertical deflection.

2. Description of Related Art

Such a scanning head is described in DE (German patent document) 3905952 A1, and its structural embodiment is shown in FIG. 6 of this patent publication. Between the stationary and the movable parts of the scanning head, there are provided three linkages, or hinged systems connected in parallel, each comprising a spring hinge and two double-jointed rods. Together, they have the shape of a cube, with the stationary part of the scanning head forming three edges converging at one corner and the movable part forming three edges converging at the diagonally opposite corner of the cube, where the scanning pin is also located. With respect to the scanning forces at the scanning pin, the design is therefore asymmetrical. As a result, the torsionally rigid construction which is desired is not adequate for use in a gear-measuring instrument.

Another scanning head known from DE (German patent document) 19500451 A1 is designed symmetrically with respect to its central axis A, and its movable parts should have as small a mass as possible. The leaf spring hinges are arranged to permit the scanning pin carrier to be displaced in the direction of the central axis and to be pivotally mounted perpendicularly to the central axis with two degrees of freedom. However, this latter feature has the decisive disadvantage that the measured result depends on the instantaneous distance between the point of contact of the scanning head tip and the pivot point of the scanning pin. Therefore, this scanning head can not be used for gear-tooth measurements in which the scanning pin must also be interchangeable with longer or even angled scanning pins, without complicated calibration. This requirement can only be met by a scanning head with a scanning pin carrier which can be deflected parallel to itself.

In addition, vertically oriented scanning heads for coordinate measuring devices are known, as described, for example, in EP (European patent document) 0693669 A2 and DE (German patent document) 3412302 A1, in which spring-jointed parallelograms, one for each of the three coordinate directions, are suspended below each other. Due to the serial arrangement of their spring elements, these kinds of scanning head have the disadvantage that the mass which is moved when the uppermost parallelogram is deflected in one coordinate direction is much greater than when the lowest parallelogram is deflected in the other coordinate direction. Thus, the deflection forces and also the oscillatory behavior within these scanning heads vary greatly during the course of the measurement, in spite of equal spring forces but different masses. This has especially negative effects on the scanning of curved designs, for example, if the scanning head is guided along the specified curve and deviations in unknown directions are to be detected. That is because the scanning pin has to deflect of its own accord in the specific direction which is currently normal to the contour being scanned. This is possible only for scanning heads with equal static and dynamic behavior in every arbitrary direction of deflection.

Furthermore, there is known from DE (patent document) 19501178 C2, a pivotable two-coordinate scanning head which was specially designed for use on numerically controlled measuring devices to measure gears and gear-like workpieces. The scanning pin is freely movable in one plane, and this measuring plane can be swiveled into preset angular positions around a horizontal axis lying in that plane. Thus, the desired normal direction must constantly be known at every measuring point in this so-called 2D-scanning head, in order to enable the measuring plane to be swiveled appropriately into place before the measurement is made. Therefore, this scanning head lacks the 3D-features that are sometimes also desired for the complete measurement of a workpiece, as required for instance in scanning unknown contours. Furthermore, off-center conditions of the scanning ball, occurring when the entire scanning head is pivoted during a measurement, have negative effects on the measurement result, so that it is not possible to use angled scanning pins with scanning balls outside the pivot axis.

SUMMARY OF THE INVENTION

Accordingly, the object of the invention is to provide a universal 3D-scanning head for gear measurement, which, given its horizontal structural orientation, behaves similarly enough both statically and dynamically, and which overcomes the above-mentioned disadvantages of known scanning heads. Also, this scanning head should constitute a torsion-resistant, low-friction overall system and meet the requirement of being convertible into a 2D-scanning head by means of an accessory device.

This object is achieved according to the invention by a scanning head having the features described hereafter.

A major advantage of the invention results from the following optimization: Conventional scanning heads whose movable connecting members have the same mass for all coordinate directions because they are implemented identically for the three spatial coordinates, have the serious disadvantages indicated above. The scanning head according to the invention overcomes these disadvantages by using connecting members for the three spatial coordinates which are implemented differently, but are positioned symmetrically and decoupled in such a way that their displaced masses can be ascertained and then equalized. Therefore the dynamic behavior of the novel scanning head is sufficiently uniform in all directions of deflection.

Additional advantages of the invention are described in detail below with reference to FIGS. 1–6.

DETAILED DESCRIPTION

Figure 1:
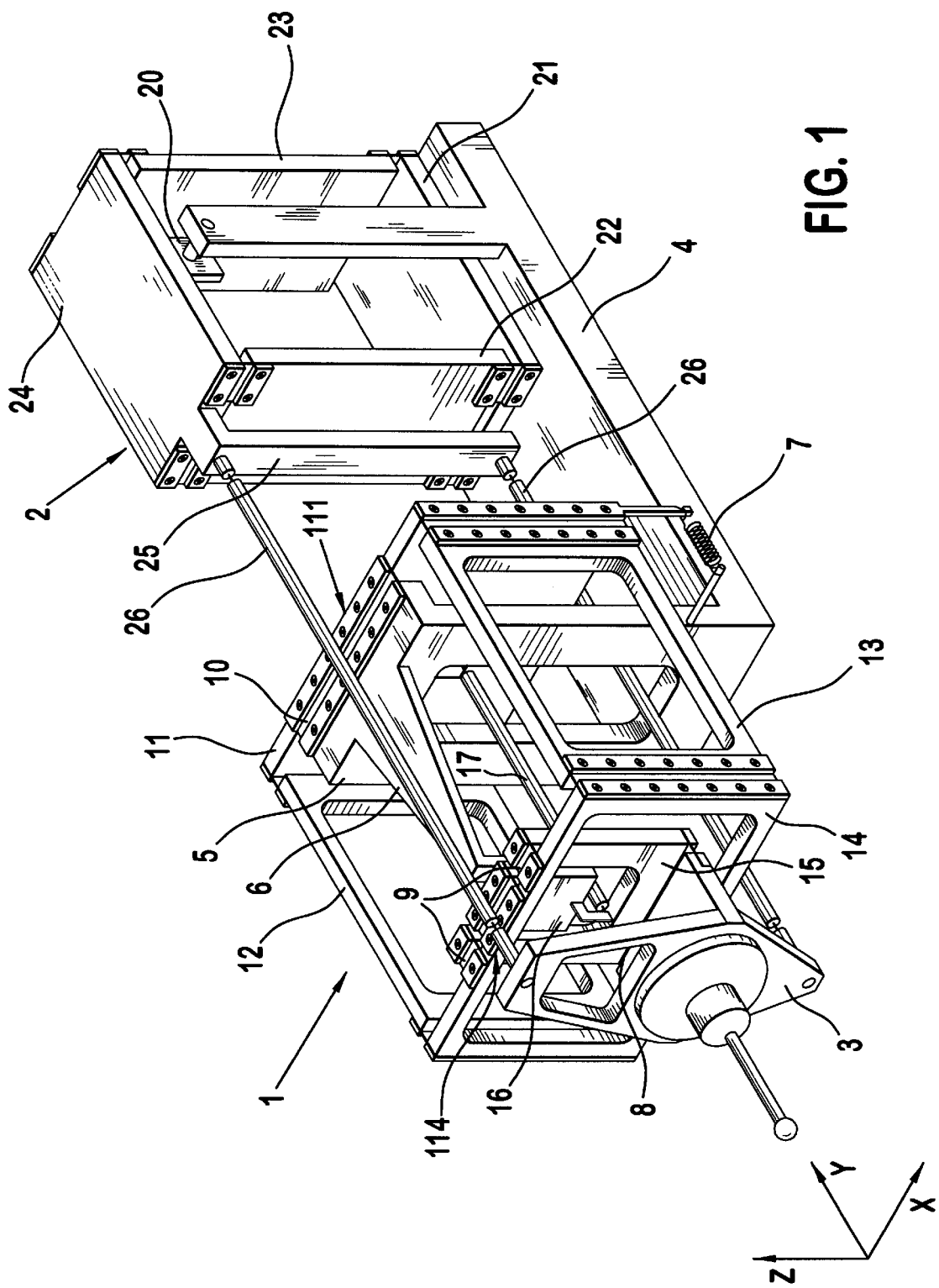
FIG. 1 is a perspective schematic which shows the mechanical construction of the scanning head, using a slightly exploded view for greater clarity.

The scanning head shown in FIG. 1 has an angular scanning head base (4) attached to a gear-measuring instrument, not further illustrated. Movably suspended at the upper end of a portion (5), also angular, of the scanning head base (4) is a first jointed parallelogram (1), which comprises elements 12, 13 and 11, 14, and enables parallel displacements of element 14 in the X-direction. Elements 12 and 13 extend horizontally parallel to the Y-direction in FIG. 1 and on opposite sides of parallelogram 1, while elements 11 and 14 extend horizontally parallel to the X-direction in FIG. 1 and at opposite ends of parallelogram 1. The spring-jointed parallelogram (1) is constructed especially sturdily using leaf springs, because it decisively determines the torsion resistance of the entire scanning head. The spring parallelogram (1) is suspended from a free edge (111) of the horizontal end element (11) in such manner that the entire parallelogram (1) is pivotable about the horizontal axis of an additional spring hinge (10). Two cruciform spring hinges can be used instead of a leaf spring hinge. An adjustable tension spring (7) provides the weight equalization necessary for the spring parallelogram (1) to assume a horizontal position when the scanning head is undeflected. The tension spring (7) is shown only schematically in FIG. 1 because, in reality, it is located inside the spring parallelogram (1) together with its adjusting mechanism.

Continuing the chain of linkages from the stationary scanning head base (4) to the three-dimensionally movable scanning pin or probe carrier (3), a connecting element (15) is provided between the spring parallelogram (1) and the scanning pin carrier (3). It is movably connected on one side to the upper free edge (114) of horizontal end element 14 by leaf spring hinges (9) which parallel the hinge (10), and on the other side to the scanning pin carrier (3) by an additional leaf spring hinge (8) paralleling hinge (10). However, the scanning pin carrier (3) is not adequately secured by this connecting element (15). Therefore, two double-jointed rods 26 are additionally attached to the scanning pin carrier (3) in spaced vertical relationship to one another and braced against the vertical member (25).

This member (25) is part of a second spring parallelogram (2) formed by horizontal top and bottom elements 24 and 21 and vertical front and rear elements 22 and 23, and attached by its element 21 to the scanning head base (4) so as to enable parallel displacements of element 24 in the Y-direction. The vertical member (25) is rigidly attached to this element 24. This construction in accordance with the invention ensures that the scanning pin carrier (3) is deflectable simultaneously in the X-, Y-, and Z-directions and is displaced only parallel to itself so that the length of the interchangeable scanning pin or probe has no effect on the result of the measurement.

An additional element (16) is provided to enable the measurement of all deflections of the scanning pin carrier (3). It is located in an appropriate recess in the connecting element (15). It is attached exactly like connecting element (15) to element 14 of spring parallelogram (1), and it is braced by the double-jointed rod 17 against vertical member (5) of scanning head base (4). Since the double-jointed rod 17 is exactly as long as the horizontal side elements (12) and (13) of the spring parallelogram (1), element (16) is displaced only in the XZ-plane and parallel to itself, during any arbitrary deflection of the scanning pin. This makes element (16) suitable for carrying scales (18) and (19) sketched in FIG. 2 and FIG. 4, which are read by two sensors shown as pointers. The pointers, in turn, are attached to a cantilever arm (6) of the scanning head base (4). The third sensor for the Y-direction, which reads the scale (20) mounted on element (24) as shown in FIG. 3, is attached to the stationary scanning head base (4) and supplied with electricity. This has the known advantage that none of the three optoelectronic measuring sensors and associated cables move, and therefore they can have no negative influence on the movable parts. Furthermore, measurement errors are prevented which can arise at sensors under oscillating load.

Figure 2:
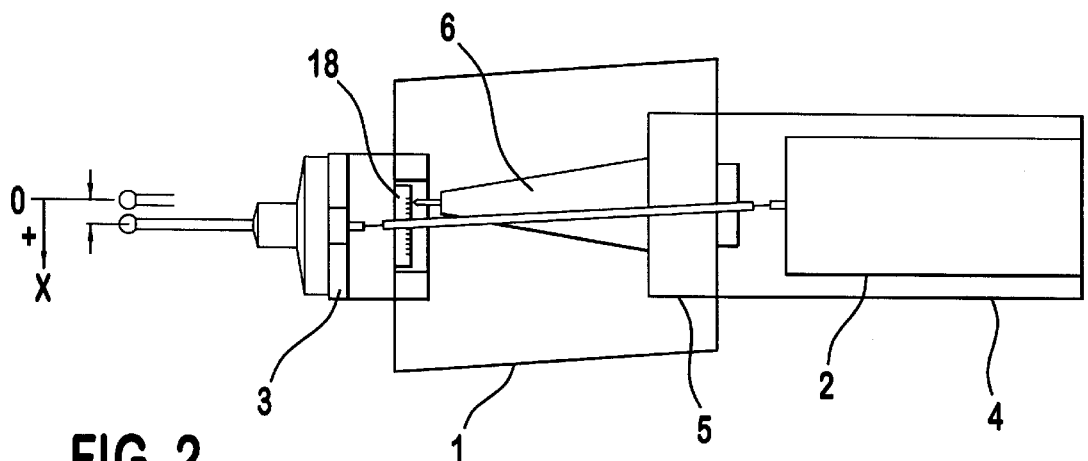
FIGS. 2, 3, 4 are schematics showing exaggerated deflections of the scanning head in the X, Y, and Z-directions, respectively.
Figure 3:
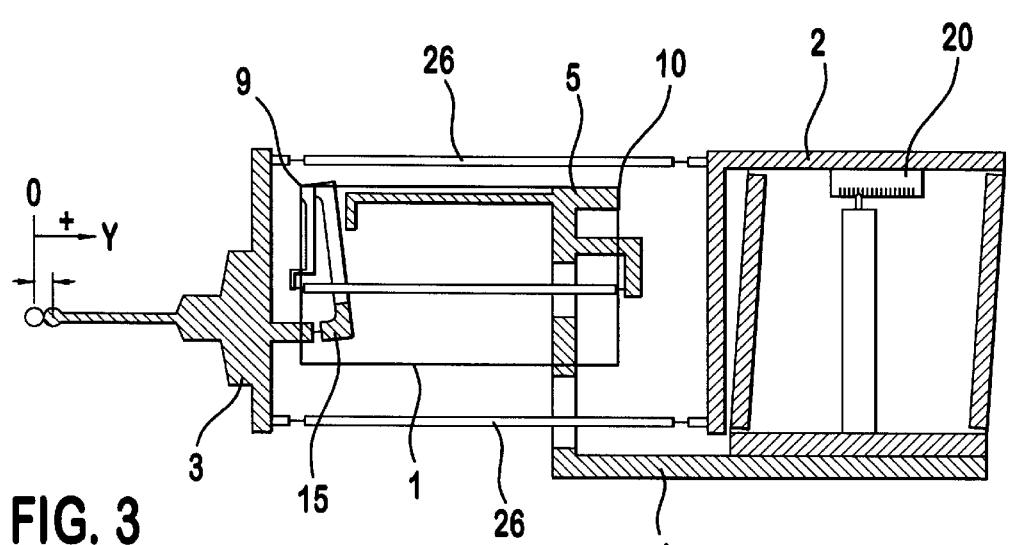

More particularly, FIG. 2 shows a plan view of the scanning head deflected only in the X-direction. It can readily be seen that the leaf springs of the spring parallelogram (1) are deformed and that the scanning pin carrier (3) has been parallel-displaced from its zero position, while the three superposed double-jointed linkage rods have followed the displacement only at one end without causing a deflection at their other end.

FIG. 3 shows a side view of a longitudinal cross-section of the scanning head, deflected only in the Y-direction. In this case the leaf springs of the second spring parallelogram (2) have been deformed because the scanning pin carrier (3) has been displaced from its zero position together with the pressure-resistant double-jointed rods 26, whereas the connecting element (15) has followed the displacement only at one end without having deflected element (16) at its other end or the spring parallelogram (1). By comparison with FIG. 2, one can recognize the decoupling of the two spring parallelograms (1) and (2) for the two deflection directions X and Y.

Figure 4:
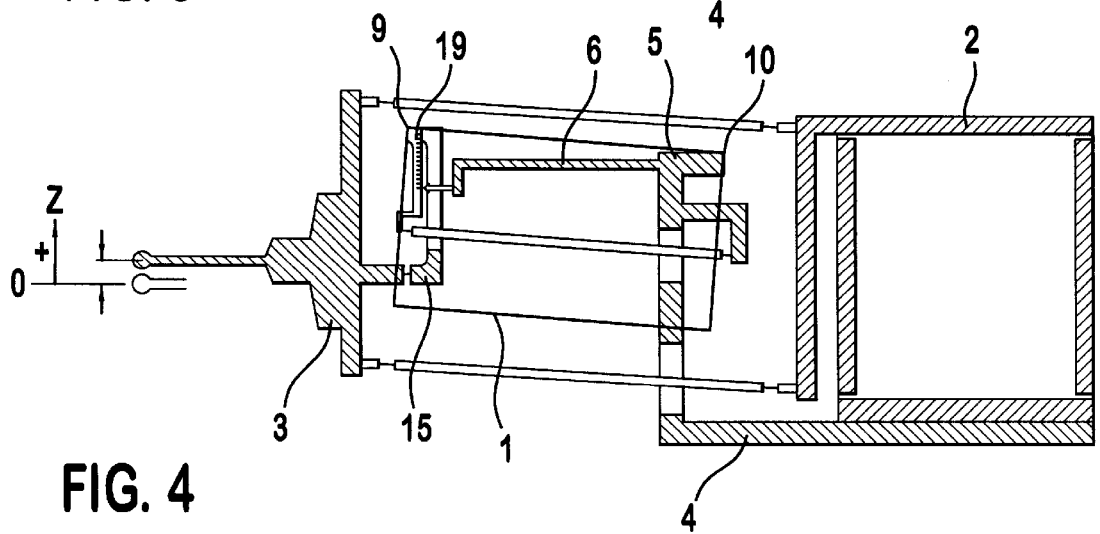

In FIG. 4, using the same scheme as in FIG. 3, the scanning head is shown deflected only in the Z-direction. In this case, the spring parallelogram (1)—itself undeformed—pivots upward like a rigid element about the axis of leaf spring hinge (10), because the scanning pin carrier (3) together with the connecting element (15) has been displaced parallel and upward from its zero position, whereas the three double-jointed rods again followed at one end only, without causing deflection of spring parallelogram (2) at the other end.

A deflection in any other arbitrary direction, not coincident with any of the three spatial coordinates X, Y, and Z, is composed in known manner of respective displacement components in the X-, Y-, and Z-directions. The corresponding movable elements of the scanning head are deflected by the amounts of these displacement components, requiring corresponding deflecting forces. The sum of the deflecting force in this arbitrary direction is then exactly as great as if the same total deflection had taken place in only one of the three deflection directions X, Y, Z of the scanning head. That is because all affected spring elements of the scanning head operate in the linear force/displacement range. Corresponding relationships also exist for the mass accelerations in the displacement components which combine into a total acceleration force, so that not only the static, but also the dynamic behavior of the scanning head is adequately uniform in every arbitrary direction.

Figure 5:
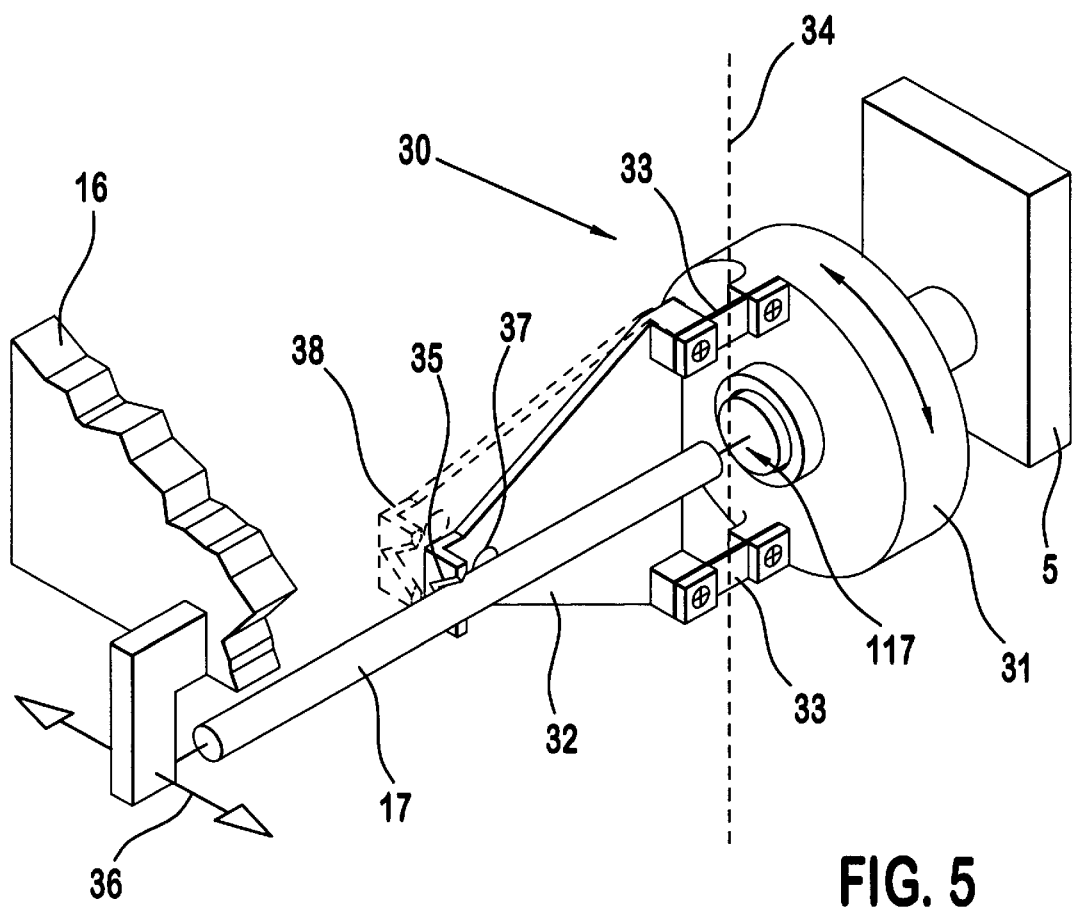
FIG. 5 shows, by means of an enlarged fragment of FIG. 1, a perspective schematic of a rotatable device (30) forming part of another embodiment of the scanning head.

In a further embodiment of the invention, the novel scanning head is provided with a rotatable device (30) according to FIG. 5, by means of which, if desired, a predeterminable deflection direction in the XZ-plane of the scanning head can be imparted to the scanning pin carrier (3) via element (16). To that end, a disc (31) is rotatably mounted on vertical member (5) of the scanning head base (4), with its axis coincident with the longitudinal axis of the undeflected double-jointed rod 17. Mounted on this disk (31) by two leaf spring hinges (33) is a swivelable bracket (32), whose pivoting axis (34) passes through a joint (117) in double-jointed rod 17. When bracket (32) engages the double-jointed rod by means of its V-shaped notch (35), in the position shown by way of example, it prevents upward or downward deflection of the double-jointed rod 17 and instead permits only the single deflection direction (36) determined by pivot axis (34) of the bracket (32). A magnet (37) ensures that the double-jointed rod 17 does not unintentionally slip out of the notch (35).

By means of a motor (not shown) on the stationary element (5), the disk (31) can also be turned to any other angular position, whereby the scanning pin carrier (3) is given an arbitrarily specifiable deflection direction in the XZ-plane, whereas there is no change in the Y-direction. That is because, as disclosed in FIG. 3, the double-jointed rod 17 is not affected by deflections of the scanning pin carrier (3) in the Y-direction. Thus, with this rotatable device (30), the scanning head as a whole has a measuring plane that can be swiveled about a horizontal axis, and thereby performs the same function as the known scanning head according to DE (German patent document) 195 01 178. However, the scanning head according to the invention has the great advantage that the scanning pin does not also turn when the deflection direction is pivoted. Therefore, any kind of arbitrarily angled scanning pins can be used, such as those for internal gears. Furthermore, the above-described operation of the rotatable device (30) can be disconnected in simple manner, and the original, three-dimensional deflectability of the scanning pin carrier (33) restored by flipping the bracket (32) with its recess (35) into the broken-line position (38), in which it no longer affects the double-jointed rod 17.

Figure 6:
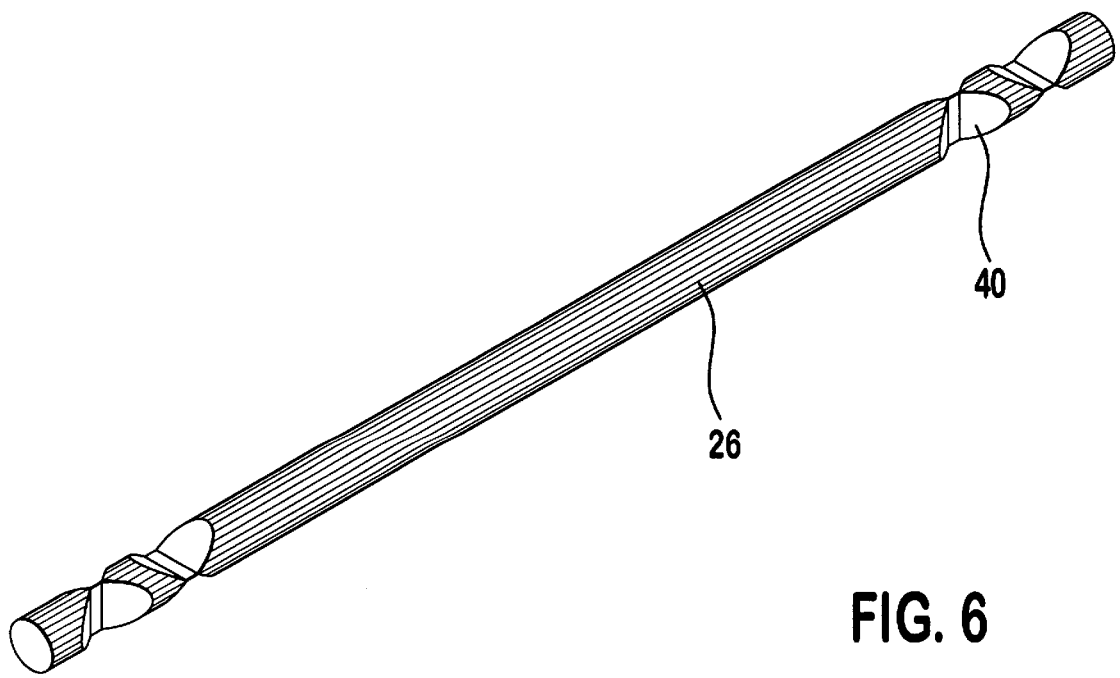
FIG. 6 shows a preferred embodiment of a double-jointed rod.

An advantageous embodiment of the double-jointed rods (26) is shown in FIG. 6. In the preceding figures, each of its two joints, which is intended to function like a ball joint, is represented by a spring wire attached at both ends. Due to the small cross-section of the wire, the stiffness in the longitudinal direction of the rod is not sufficient for reliably transmitting, to the spring parallelogram (2), all deflections of the scanning pin carrier (3) in the Y-direction. Therefore each two-dimensional joint of a double-jointed rod is provided with four lateral trapezoidal recesses (40). Every two are located in opposite pairs and slightly spaced apart along the rod and offset by 90°. A narrow rectangular cross-section is left between two opposite recesses (40) to act like a leaf spring, so that the four recesses collectively form a universal joint. The advantage of this construction is that, at low production cost, there is created from a single blank a double-jointed rod having low-friction and low-wear two-dimensional joints, which can be loaded in tension and compression. The restoring forces arising from deflection of the double-jointed rod enhance the stability and functioning of the entire scanning head.

What is claimed is:

1. A horizontally oriented scanning head for numerically controlled gear-measuring instruments, having a scanning pin carrier (3) which is deflectable parallel to itself with several degrees of freedom, said scanning pin carrier being linked to a stationary scanning head base (4) via several spring-parallelogram systems in functionally parallel arrangement, and the deflections of said scanning pin carrier being detectable by three sensors attached to said scanning head base (4) for the three spatial coordinate directions X, Y, and Z, said scanning head being characterized by a first spring parallelogram (1) comprising side elements (12 and 13) and two end elements (11 and 14), suspended from a vertical member (5) of said scanning head base (4) via a spring hinge (10) at a free edge (111) of one of said end elements (11) so as to be pivotable about a horizontal axis, a connecting element (15) pivotably suspended at one side from an upper free edge (114) of the other of said end elements (14) by means of a spring hinge (9) paralleling said hinge (10) at said free-edge, and connected at its other side to said scanning pin carrier (3) by a spring hinge (8) paralleling said spring hinge (10) at said free-edge, said connecting element (15) preventing displacements of said first spring parallelogram (1) during deflections of said scanning pin carrier (3) in the Y-direction, an additional element (16) pivotably suspended from said upper free edge (114), and braced against said vertical member (5) by means of a double-jointed bracing rod (17) having the same length as said side elements (12) and (13), said additional element (16) accompanying displacements only during deflection of said scanning pin (3) in the XZ-directions, a second spring parallelogram (2) for deflections of said scanning pin carrier (3) in the Y-direction comprising horizontal top and bottom elements (24 and 21) and vertical front and rear elements (22 and 23), attached to said scanning head base (4) behind the first spring parallelogram (1), the top element (24) of said second spring parallelogram (2) being connected to said scanning pin carrier (3) via double-jointed rods (26) which transmit only deflections of said scanning pin carrier in the Y-direction.

2. The scanning head of claim 1, comprising a rotatable device (30) whose axis of rotation parallels the Y-direction and which is adapted to be coupled to said additional element (16) so as to limit deflection of said element (16) in the XZ-directions, thereby limiting the deflection of said scanning pin carrier (3) to a predeterminable direction.

3. The scanning head of claim 2 wherein said rotatable device (30) comprises a disk (31) mounted on said vertical member (5) of said scanning head base(4), said disk (31) being adapted to be rotated by a motor about the longitudinal axis of a double-jointed bracing rod (17) and carrying a pivotable bracket (32) which can be snapped onto said double-jointed bracing rod (17) at a V-shaped notch (35) of a bracket (32), a pivot axis (34) of said bracket (32), which passes through a hinge (117) of said double-jointed bracing rod (17), determining a limited deflection direction (36) of said additional element (16) and thereby that of said scanning pin carrier (3).

4. The scanning head of claim 1, characterized in that each double joint of said double-jointed bracing rod (17) and of said double-jointed rods (26) is formed respectively by two pairs of lateral notches spaced slightly apart and offset by 90°.

* * * * *